(12) United States Patent
Backhouse

(10) Patent No.: US 8,276,488 B2
(45) Date of Patent: Oct. 2, 2012

(54) BORING MACHINE FOR TURBINE CASINGS

(75) Inventor: Anthony Edward Backhouse, Williamstown (AU)

(73) Assignee: Self Leveling Machines, Inc., The Woodlands, TX (US)

( * ) Notice: Subject to any disclaimer, the term of this patent is extended or adjusted under 35 U.S.C. 154(b) by 174 days.

(21) Appl. No.: 12/525,530

(22) PCT Filed: Oct. 25, 2007

(86) PCT No.: PCT/AU2007/001625
§ 371 (c)(1),
(2), (4) Date: Mar. 15, 2010

(87) PCT Pub. No.: WO2008/092184
PCT Pub. Date: Aug. 7, 2008

(65) Prior Publication Data
US 2010/0202841 A1  Aug. 12, 2010

(30) Foreign Application Priority Data
Feb. 1, 2007 (IN) .............................. 225/CHE/2007

(51) Int. Cl.
*B23B 41/00* (2006.01)
*B23B 41/06* (2006.01)
(52) U.S. Cl. .............................................. 82/1.2; 82/1.5
(58) Field of Classification Search ............... 82/1.2, 82/1.11, 1.5; 408/13, 8; 29/402.02, 402.19; 407/29, 30
See application file for complete search history.

(56) References Cited

U.S. PATENT DOCUMENTS

| | | | |
|---|---|---|---|
| 2,846,828 A | 8/1958 | Pilon, Sr. | |
| 3,046,648 A * | 7/1962 | Kelly | 228/181 |
| 3,785,746 A | 1/1974 | Wolf et al. | 408/182 |
| 4,403,860 A * | 9/1983 | Pryor | 356/615 |
| 4,561,058 A * | 12/1985 | McMurtry | 700/195 |
| 4,620,281 A | 10/1986 | Thompson et al. | |
| 4,637,248 A * | 1/1987 | Thompson et al. | 73/37.5 |
| 4,679,472 A * | 7/1987 | Feller et al. | 82/19 |
| 4,805,282 A | 2/1989 | Reaves et al. | |
| 4,927,300 A * | 5/1990 | Ramalingam et al. | 407/120 |
| 5,030,041 A * | 7/1991 | Marron | 408/83.5 |
| 5,086,590 A * | 2/1992 | Athanasiou | 451/5 |
| 5,159,862 A | 11/1992 | Brynes et al. | |
| 5,393,288 A | 2/1995 | Miyasaka et al. | |
| 5,871,391 A * | 2/1999 | Pryor | 451/9 |
| 5,904,867 A | 5/1999 | Herke | |
| 6,062,778 A * | 5/2000 | Szuba et al. | 408/156 |
| 6,655,883 B2 * | 12/2003 | Maar | 408/158 |
| 2005/0137069 A1* | 6/2005 | Ueda | 483/27 |

FOREIGN PATENT DOCUMENTS
DE  2734126 A1  2/1979
GB  2 103 129 A  2/1983

OTHER PUBLICATIONS

International Search Report, mailed Feb. 7, 2008, for PCT/AU2007/001625, 3 pages.

* cited by examiner

*Primary Examiner* — Will Fridie, Jr.
(74) *Attorney, Agent, or Firm* — Seed IP Law Group PLLC

(57) ABSTRACT

A boring machine including a rotatable boring bar carrying a tool holder that is movable radially of the boring bar, wherein a sensor is provided on the tool holder to sense the proximity thereof to a work piece having a variable radius of curvature in a plane perpendicular to the boring bar.

11 Claims, 12 Drawing Sheets

Detail A

BORING MACHINE FOR TURBINE CASINGS

FIELD OF THE INVENTION

The present invention relates to a boring machine for turbine casings having caulked-in seal fins.

BACKGROUND OF THE INVENTION

Axial flow steam turbines generally include fixed stator blades, rotating rotor blades, between-blade seal fins, and a casing surrounding them. The seal fins are commonly retained in circumferential grooves in the casing by caulking wire.

The fins lose their sealing efficiency through wear and need to be refurbished to maintain turbine performance. This typically involves removing the turbine to a workshop, separating the casing into half-casings, and removing both the stator and rotor blades to access the seal fins and caulking wire. The old fins are then machined down to access the caulking wire which is carefully machined out to avoid damaging the grooves of the half-casings. Replacement fins and caulking wire are then mounted in the grooves, and the replacement fins are machined down to precise clearances from the rotor shaft and blades.

Precision machining of seal fins and caulking wire is extremely difficult because the half-casings deform when the casing split joint (or horizontal half-joint) is opened due to stress changes created after years of use. This causes the radius of curvature of the grooves, and hence the radial position of the seal fins and caulking wire, to differ at different points around the inner diameter of the half-casings. For example, the split half-casings can be up to 1.5 mm out of round.

It would be advantageous to refurbish caulked-in seal fins on-site where the turbine is normally operated, and with the stator blades in situ in the half-casings.

A need therefore exists for a boring machine for on-site refurbishment of seal fins caulked in turbine half-casings having a variable radius of curvature.

SUMMARY OF THE INVENTION

According to the present invention, there is provided a boring machine including a rotatable boring bar carrying a tool holder that is movable radially of the boring bar, wherein a sensor is provided on the tool holder to sense the proximity thereof to a work piece having a variable radius of curvature in a plane perpendicular to the boring bar.

The boring machine can further include a motor to move the tool holder radially, and a controller to control the motor in response to the sensor.

The controller can be programmable so that in use a tool held by the tool holder is controllably moved radially by the motor to follow the variable radius of curvature of the work piece at a preselected working depth during rotation of the boring bar.

The tool holder can be carried by a carriage that is movable axially along the boring bar.

The boring bar can be rotatable between supports adapted to removably mount in a turbine half-casing.

The work piece can be a seal fin and/or an adjacent caulking wire therefor in a groove in the turbine half-casing.

The tool holder can exchangeably hold a rotatable disc having an abrasive and/or cutting periphery.

The present invention also provides a method of refurbishing seals fins caulked in a half-casing of a turbine using the above described boring machine.

The half-casing can include stator blades, and the method can be performed with the stator blades in situ in the half-casing.

The method can be performed on-site where the turbine is normally operated.

BRIEF DESCRIPTION OF THE DRAWINGS

The invention will be further described by way of example only with reference to the accompanying drawings, in which.

DETAILED DESCRIPTION

Figure 1:
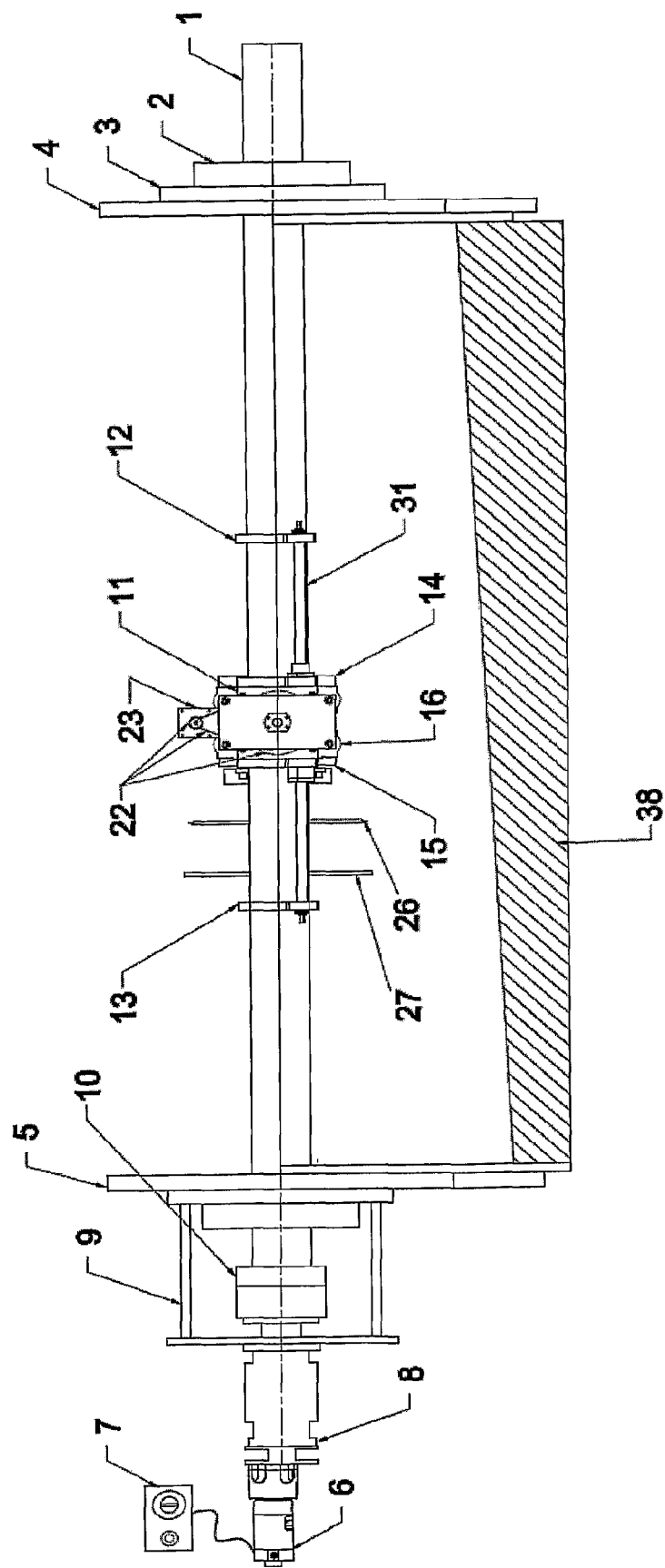
FIGS. 1 and 2 are side and perspective views of a boring machine of one embodiment of the invention positioned in a turbine half-casing.
Figure 2:
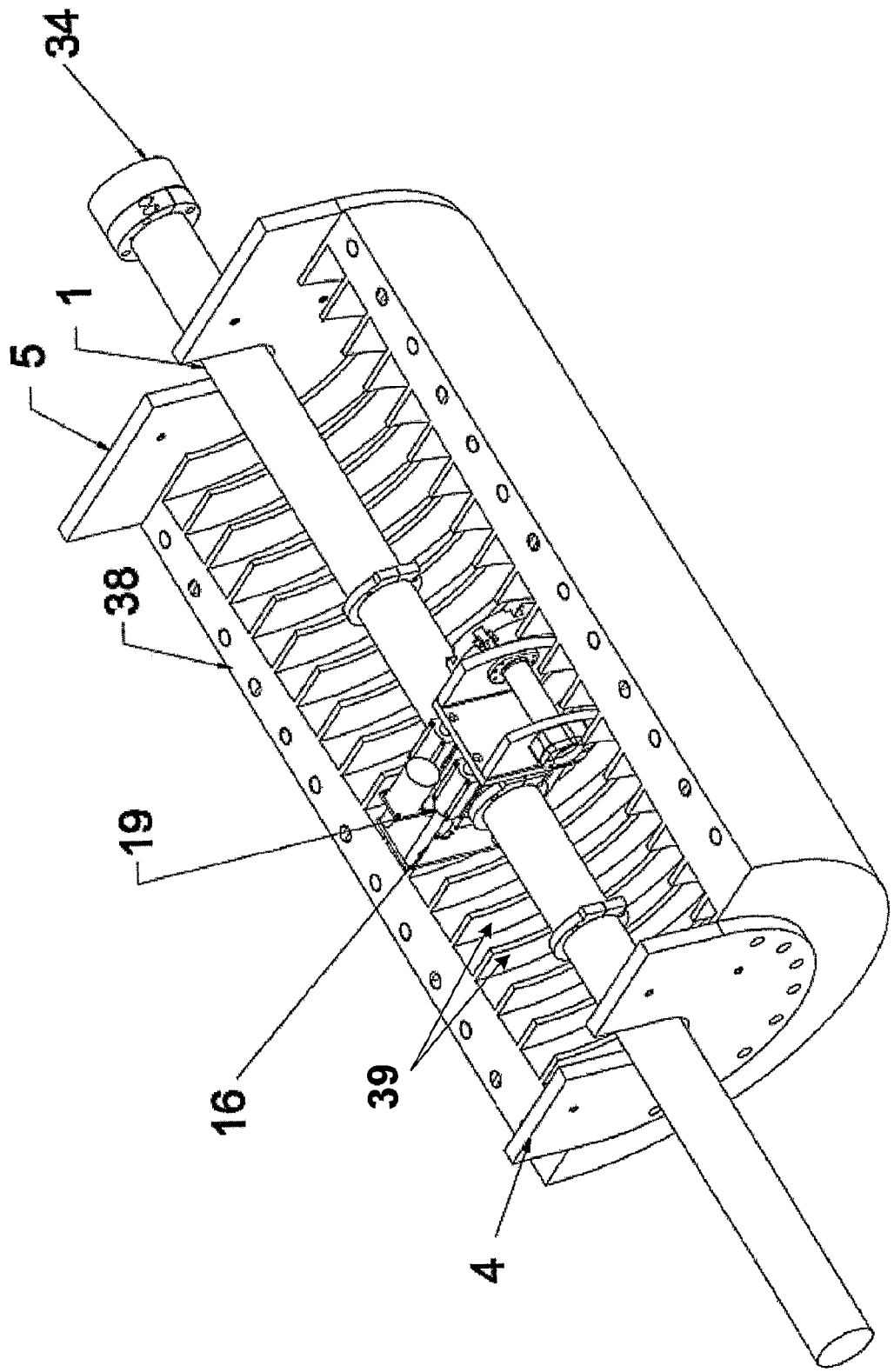

Referring to FIG. 1, a boring machine of an embodiment to be described includes a rotatable boring bar 1 carried at each end in bearing supports 2, 3 which are removably mounted in the inlet and outlet of a steam turbine half-casing 38 via frames 4, 5. The bearing supports 2, 3 are adjustable to locate the boring bar 1 perpendicular to the grooves in the half-casing 38 and, preferably, aligned with the central axis of the half-casing 38. (Note that the sub-components of the turbine half-casing 38 are omitted from FIG. 1 for clarity.)

Referring to FIGS. 2 and 9 to 12, the sub-components of the half-casing 38 include radially inwardly extending stator blades 39 and seal fins 40. The seal fins 40 are retained between the stator blades 39 in circumferential grooves in the half-casing 38 by caulking wire 41. (Note that the seal fins 40 and caulking wire 41 are omitted from FIG. 2 for clarity.)

The boring bar 1 is driven by a rotary drive which includes a variable speed electric motor 6 connected to a power source 7. The variable speed motor 6 is connected to the boring bar 1 by a gear box 8, torque reaction arms 9, and a bar end coupling 10. Other equivalent rotary drives may also be used. In use, the boring bar 1 is rotated at a milling speed, for example, 150 to 500 mm per minute around the inner diameter of the half-casing 38 being refurbished.

Figure 3:
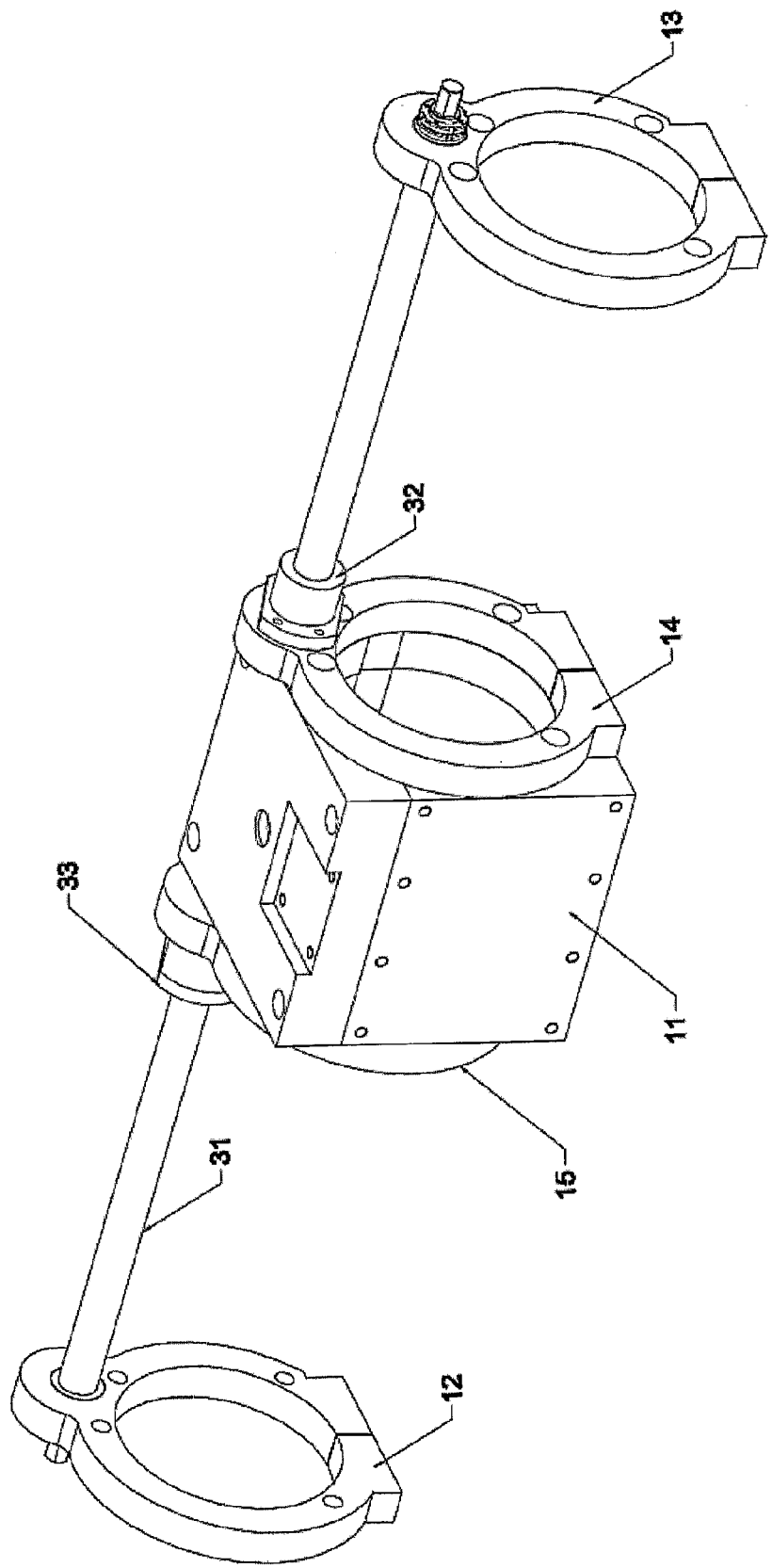
FIG. 3 is a perspective view of a carriage of the boring machine.

A carriage 11 is manually movable axially along the boring bar 1 by a lead screw assembly 31, 32 and locked in the desired axial position. As best seen in FIG. 3, the lead screw assembly 31, 32 is externally mounted to the boring bar 1 by clamps 12, 13, and the carriage 11 is mounted to the boring bar 1 by carriage clamps 14, 15. The external mounting of the lead screw assembly 31, 32 allows for easy replacement of the boring bar 1. Other equivalent but more complicated mounting arrangements may also be used, for example, the lead screw assembly 31, 32 may be keyed to, or arranged inside, the boring bar 1.

Although not illustrated, a key extends along the length of the boring bar 1 so that the weight of the carriage 11 is supported by the key when the carriage clamps 14, 15 are released. A tool holder 20 is rigidly mounted to the carriage 11 by four shafts 19 mounted to a plate 17. The tool holder 20 is movable radially inwardly and outwardly by runner blocks 16 that slide on the shafts 19.

Figure 4:
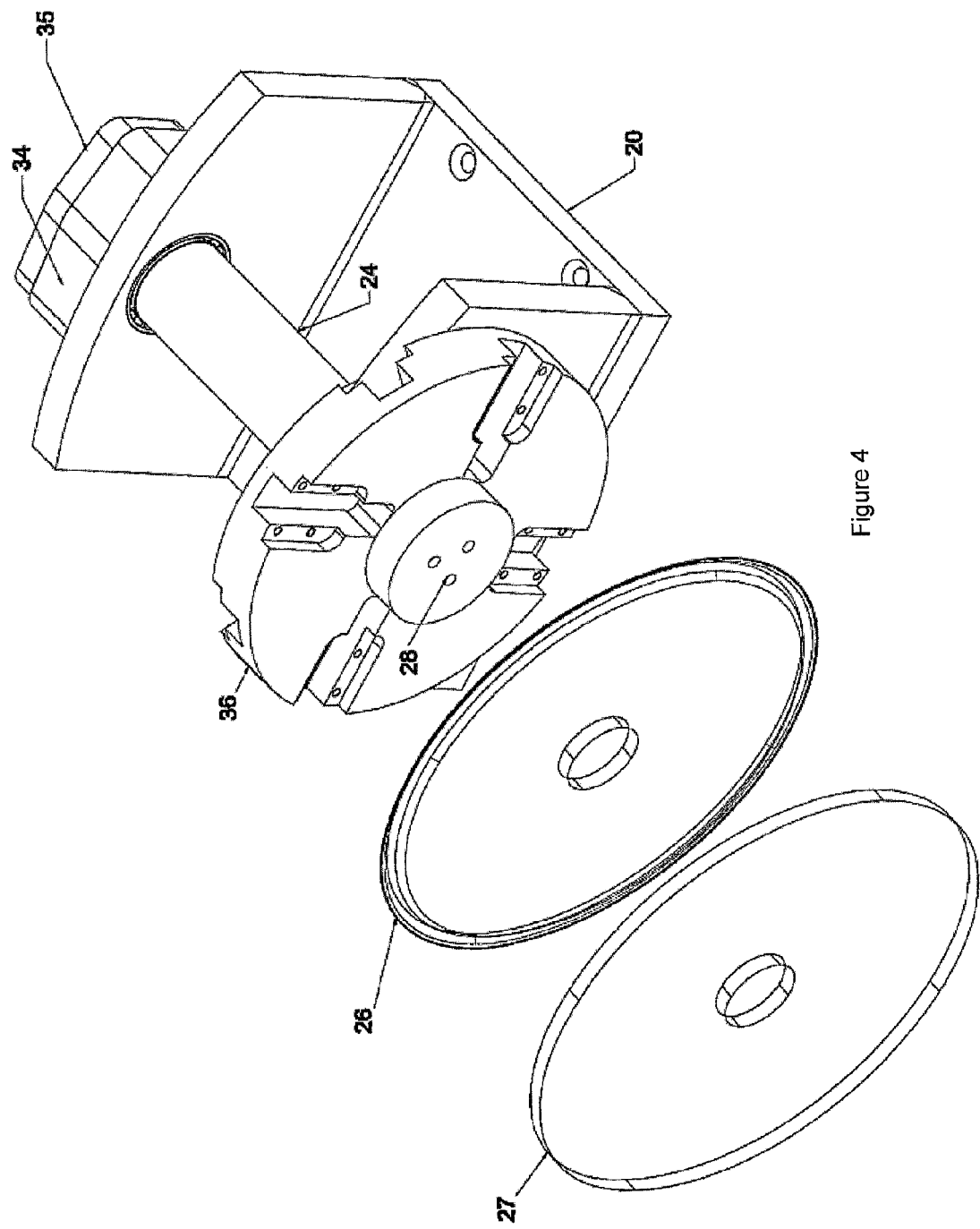
FIG. 4 is a perspective view of a tool holder of the boring machine with a rim cutter, and cutting and grinding discs.
Figure 5:
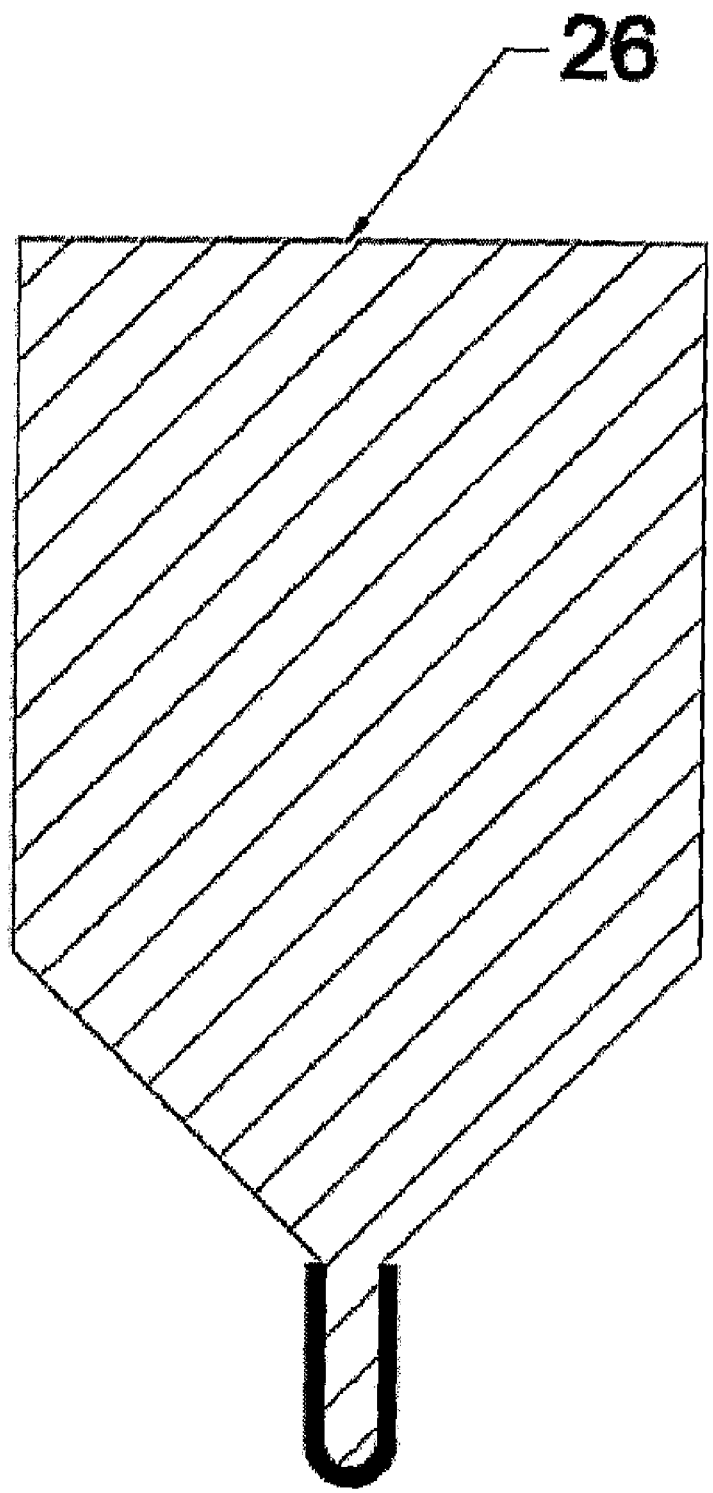
FIGS. 5 and 6 are sections through the peripheries of the cutting and grinding discs.
Figure 6:
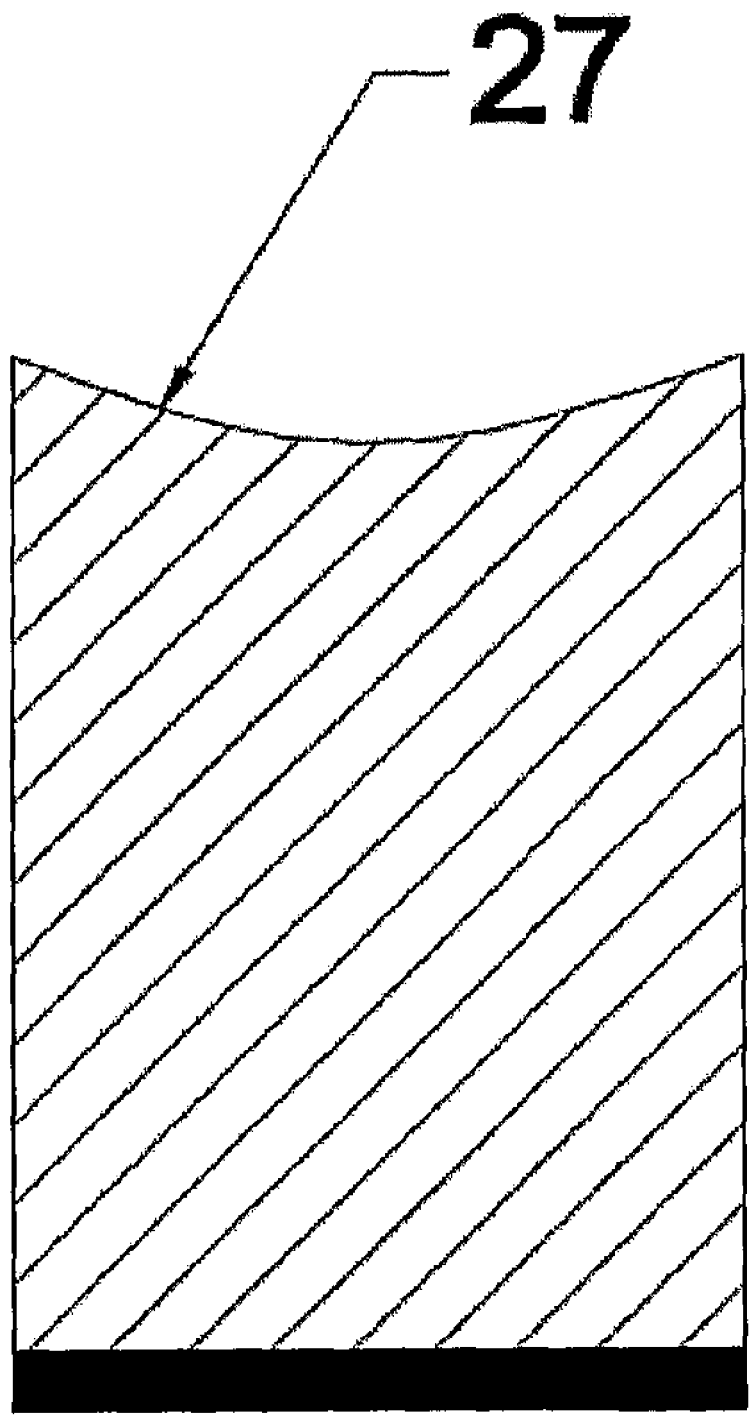

As best seen in FIG. 4, the tool holder 20 rotatably carries a shaft 24 parallel to the boring bar 1 close to the inner diameter of the stator blades. The shaft 24 is rotatably driven at one end by a hydraulic drive 25. Other equivalent drives for the shaft 24 may also be used, for example, an electric drive. The free end of the shaft 24 holds a machining tool, for example, a rim cutter 36, a narrow-rimmed cutting and/or abrasive disc 26, and a square-rimmed cutting and/or abrasive disc 27. FIGS. 5 and 6 illustrate the respective profiles of the peripheries of discs 26, 27 with the solid dark regions representing coatings of an abrasive and/or cutting material, for example, diamond, boron trinitride, etc. The rim cutter 36 and discs 26, 27 are exchangeably held on the shaft 24 by a holding plate 28.

Figure 7:
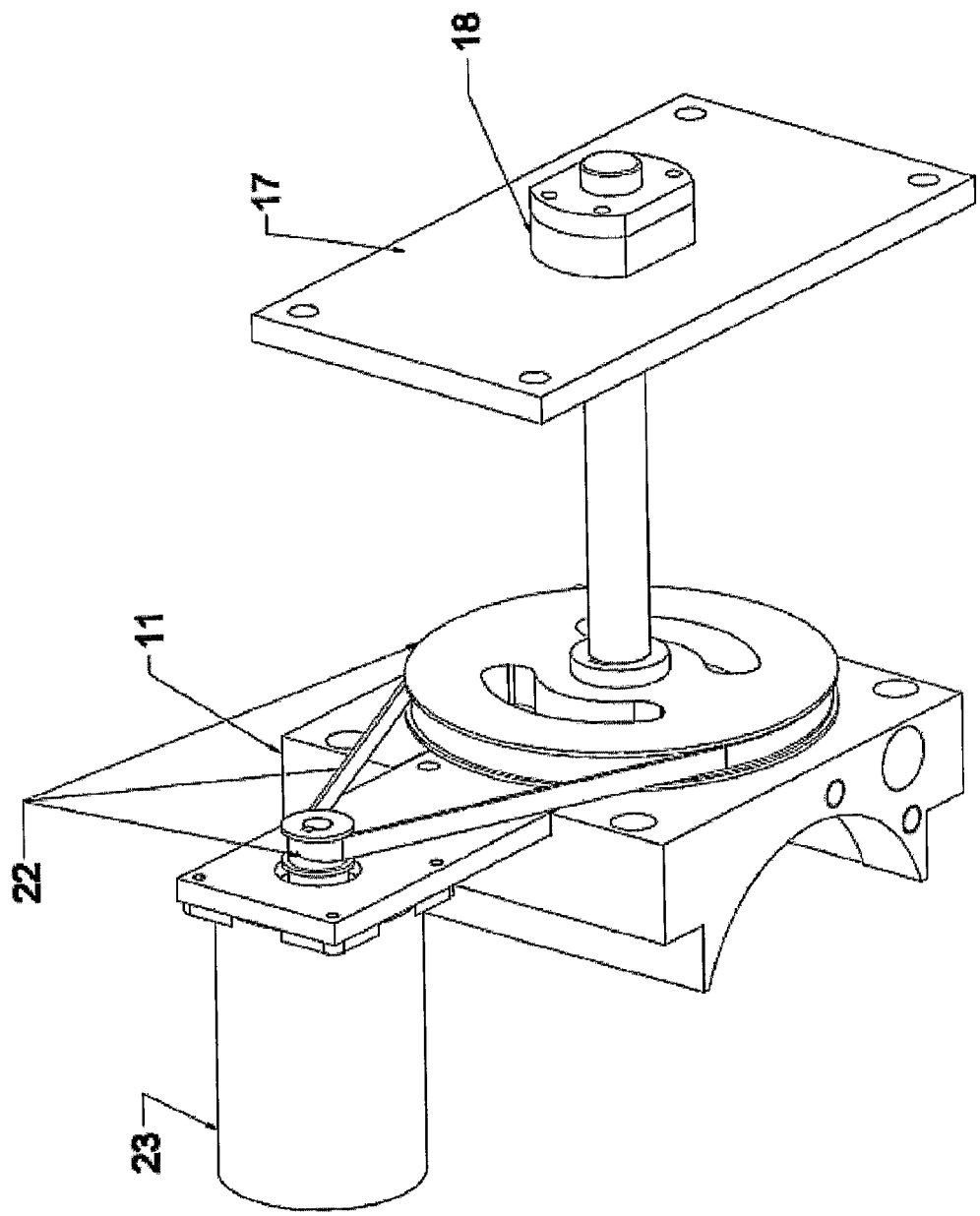
FIG. 7 is a perspective view of a radial-feed drive for the tool holder.
Figure 8:
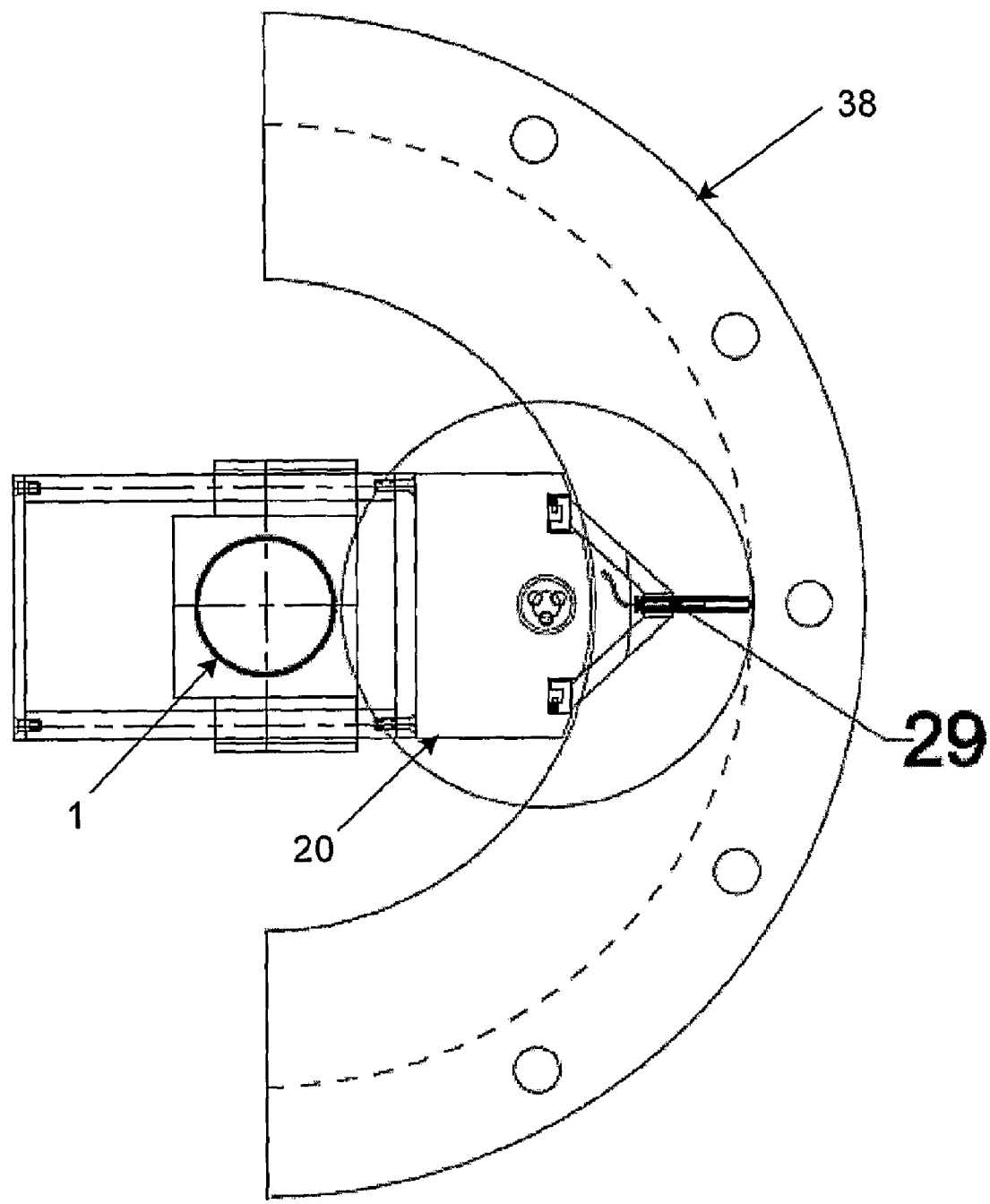
FIG. 8 is a section through a turbine half-casing showing the probe of the boring machine positioned against the inner diameter of the turbine half-casing.

The tool holder 20, and hence a tool held thereby, is controllably movable radially inwardly and outwardly relative to the carriage 11 on the boring bar 1. Referring to FIG. 7, this controlled radial movement is provided by a ball screw nut 18 and ball screw rod 21 which is rotatably driven inwardly and outwardly from the plate 17 by a servo or stepper motor 23 via pulleys 22. The servo motor 23 is mounted on the opposite side of the carriage 11 to the tool holder 20 so as to provide a compact, space-saving arrangement. The radial position of the tool holder 20 relative to the warped or distorted inner diameter of the half-casing 38 is monitored by a sensor 29, for example, a linearly variable displacement transformer (LVDT) or a digital probe. Referring to FIG. 8, the sensor 29 is positioned on the tool holder 20 so as to be as close as practical to seal fins 40 and/or caulking wire 41 being machined.

In use, the sensor 29 provides input to a controller 30 which controls the radial position of the tool holder 20 in response to the sensor 29 by controlling the servo motor 23 to rotate the ball screw or threaded lead screw 21 so as to maintain a constant distance between the working face or edge of a tool held by the tool holder 20 and inner diameters of the half-casing 38, the caulked-in seal fins 40, and their caulking wire 41. Other equivalent arrangements to control relative radial movement and positioning of the tool holder 20 and tools held thereby may also be used.

The controlled radial movement of the tool holder 20 provided by the sensor 29 and the controller 30 advantageously automatically adjusts the working depth of tools held by the tool holder 30 to accommodate circumferential warping or distortion in the half-casing 38. In addition, the sensor 29 and the controller 30 also automatically adjust the working depth of tools held by the tool holder 30 to accommodate axial warping or distortion in the boring bar 1 itself. The boring bar 1 can therefore be made thinner and less rigid, and need not be precisely rotatably supported between complicated bearings.

Figure 9:
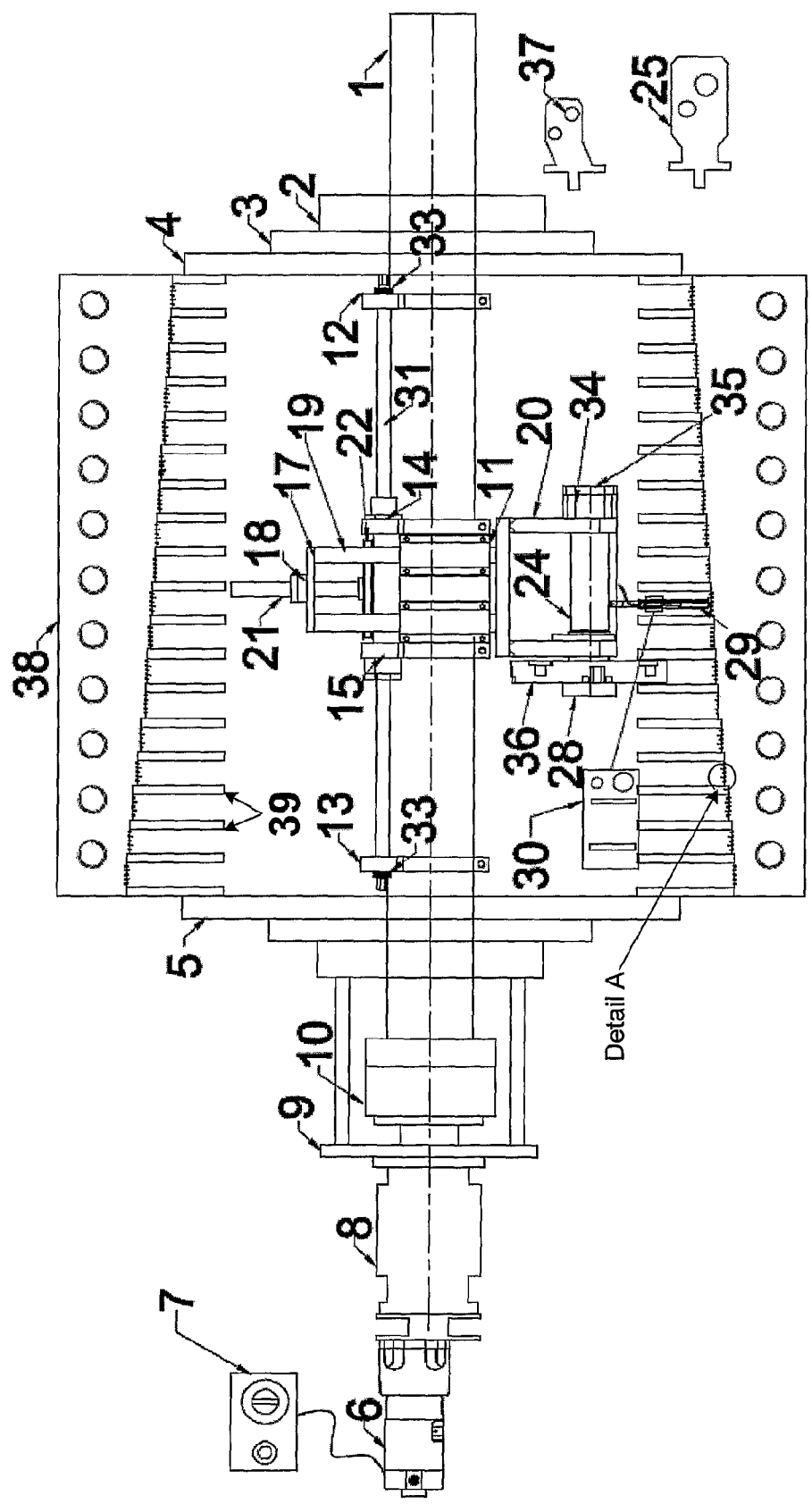
FIGS. 9 to 11 are sections through the turbine half-casing showing sequential operation of the boring machine to trim old seal fins, cut caulking wires, and trim replacement seal fins.

Referring to FIG. 9, refurbishment of caulked-in seal fins 40 starts by machining down or trimming old caulked-in seal fins 40 using a rim cutter 36 fitted to the shaft 24 of the tool holder 20. Although not illustrated in FIG. 4, cutting blades are received in radial slots on both faces of the disc of the rim cutter 36. The cutting blades are adjustable radially inwardly and outwardly to allow the rim cutter 36 to accommodate seal fins 40 having different inner diameters. The controlled radial movement of the tool holder 20 allows the rim cutter 36 to follow the variable inner diameter of old seal fins 40 in a warped half-casing 38. The cross-sectional width of the disc of the rim cutter 36 is less than the spacing of the stator blades 39. This allows old caulked-in seal fins 40 to be cut down to short stubs with the stator blades 39 in situ in the half-casing 38. The compact arrangement of the shaft 24 in the tool holder 20 keeps the shaft 24 clear of the inner diameter of the stator blades 39 while old caulked-in seal fins 40 undergo trimming by the rim cutter 36.

Figure 10:
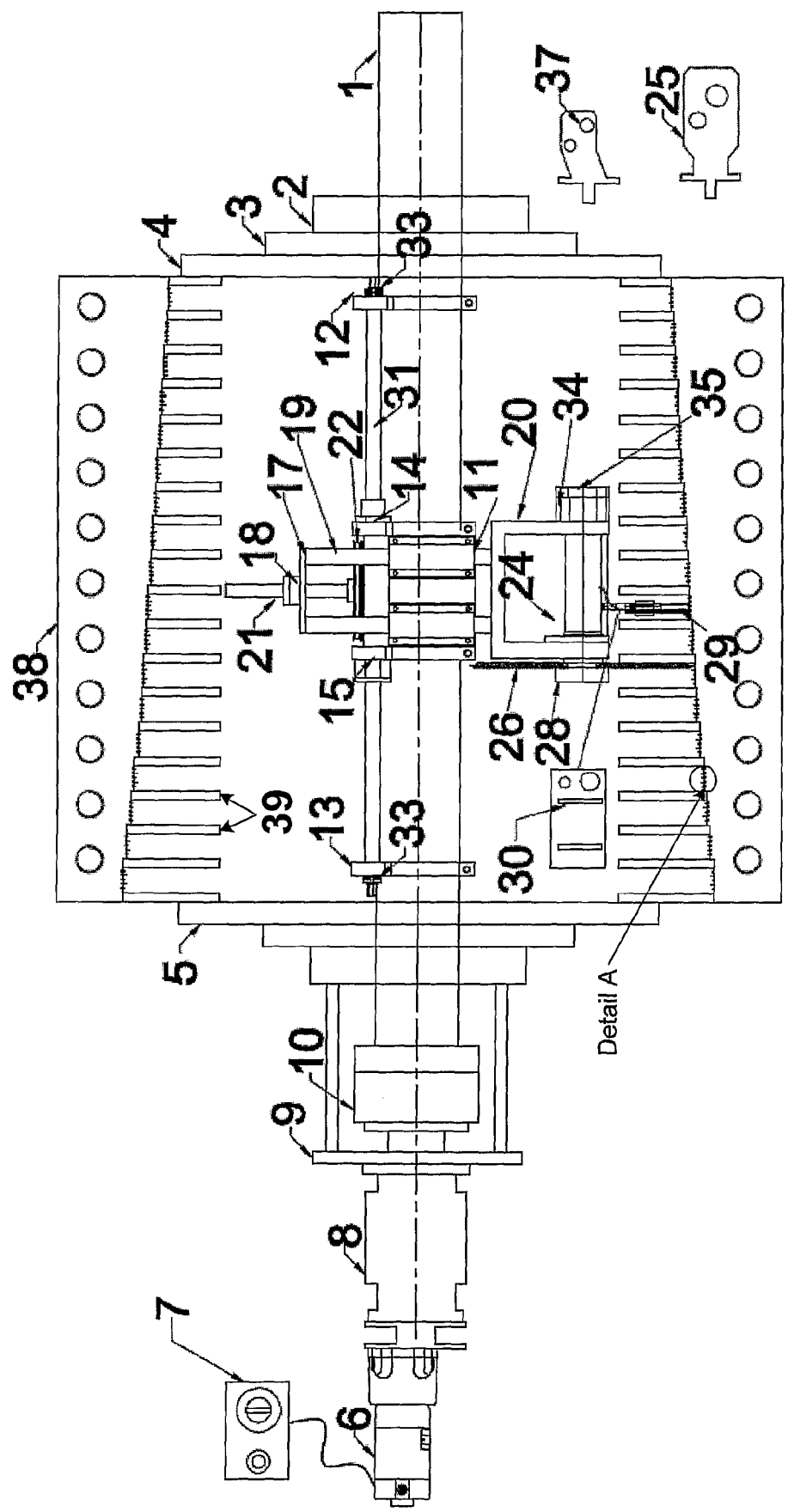

Referring to FIG. 10, after the old seal fins 40 have been trimmed to allow access to the old caulking wires 41, the rim cutter 36 is replaced with the narrow-rimmed disc 26 to machine out the caulking wires 41. The narrow-rimmed disc 26 can be an abrasive or cold saw disc. For example, an abrasive disc is preferred if the caulking wire work hardens. The diameter of the disc 26 is preselected so that it can cut the caulking wire 41 without touching the boring bar 1. For example, the disc 26 may be selected from a range of discs 26 having mutually different working or cutting diameters. In use, the tool holder 20 remains clear of the stator blades 39 with sufficient clearance from the carriage 11 for one size of disc 26 to accommodate a range of stator blade 39 and seal fin 40 inner diameters.

To cut and machine out the caulking wire 41, the tool holder 20 is driven above the half-joint face of the half-casing 38 and a correct diameter disc 26 is fitted to the shaft 24. A high speed hydraulic motor 37 is fitted via mount plate 35 for abrasive cutting, while a low speed hydraulic motor and gear box 25 may also be fitted via mount plate 34 for cold sawing. The disc 26 is lowered close to the half-joint inner edge and the carriage clamps 14, 15 are released so that the weight of the machining assembly is supported by the key along the boring bar 1. Next, the carriage 11, the tool holder 20 and the disc 26 are moved axially along the boring bar 1 using the manually cranked lead screw 31, 32, 33 until the cutting edge of the disc 26 is positioned over the caulking wire 41 to be cut. The carriage clamps 14, 15 are then re-tightened.

The boring bar 1 is then rotated slowly and the disc 26 is adjusted radially using either manual control or electronic manual feed until the disc 26 is just touching the caulking wire 41. The hydraulic motor 37 is started and the disc 26 is fed into the desired depth, for example, around 20 to 50% of the depth of the caulking wire 41, or about 0.2 to 0.7 mm. The feed-in depth of the disc 26 is indicated by a linear scale (not shown) which indicates the radial travel of the tool holder 20. The linear scale is zeroed and the set depth is then shown as a direct reading on the linear scale. The sensor 29 and the controller 30 are then set to automatically maintain the disc 26 at the desired constant cutting or working depth. Next, the boring bar 1 begins rotation and starts to circumferentially move the disc 26 around the inner diameter of the half-casing 38. The controller 30 controls the servo motor 23 in response to the sensor 29 so that the caulking wire 41 is cut by the disc 26 to a constant depth regardless of warping or distortion of the half-casing 38. As mentioned above, the boring bar 1 is positioned perpendicular to the grooves of the half-casing 38 before the machining starts.

With the caulking wire 41 cut down and weakened, both the wire 41 and the associated seal fin 40 can be pulled out of the groove in the half-casing 38. The tool holder 20 is then returned by running back on the running blocks 16 through the same cut to the starting point. The cutting sequence can be selectively varied, for example, two small or shallow half-circle cuts can be made in alternate rotations, or a single large or deep half-circle cut can be made. For example, after completing one half-circle through the casing, the disc 26 can be realigned to the next caulking wire 41 and the disc 26 moved through one half-circle in the reverse direction so as to cut a second wire 41 and return to the original angular starting point. Alternatively, the disc 26 can be driven through one full rotation to make one half-circle cut in each caulking wire 41.

Figure 11:
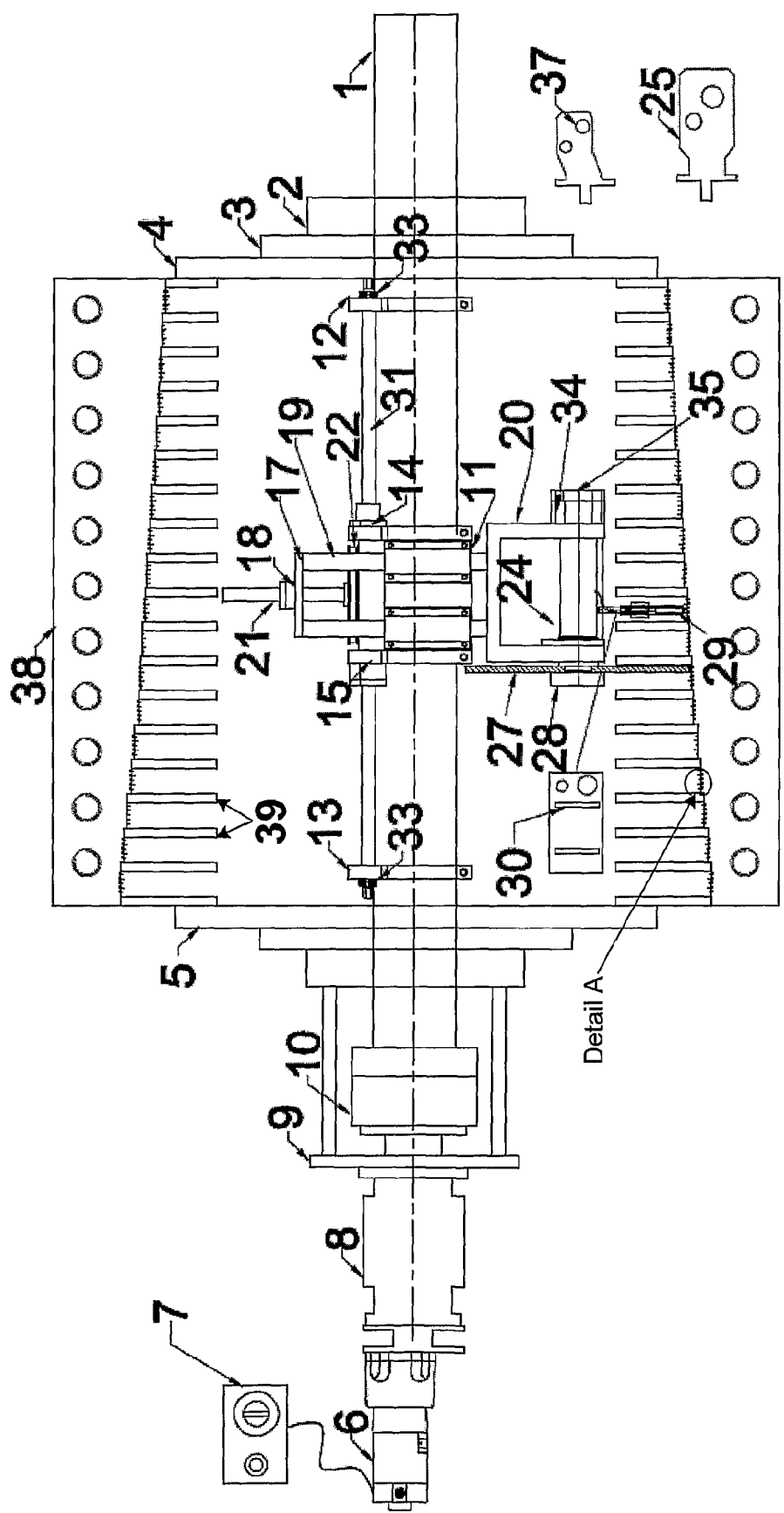
Figure 12:
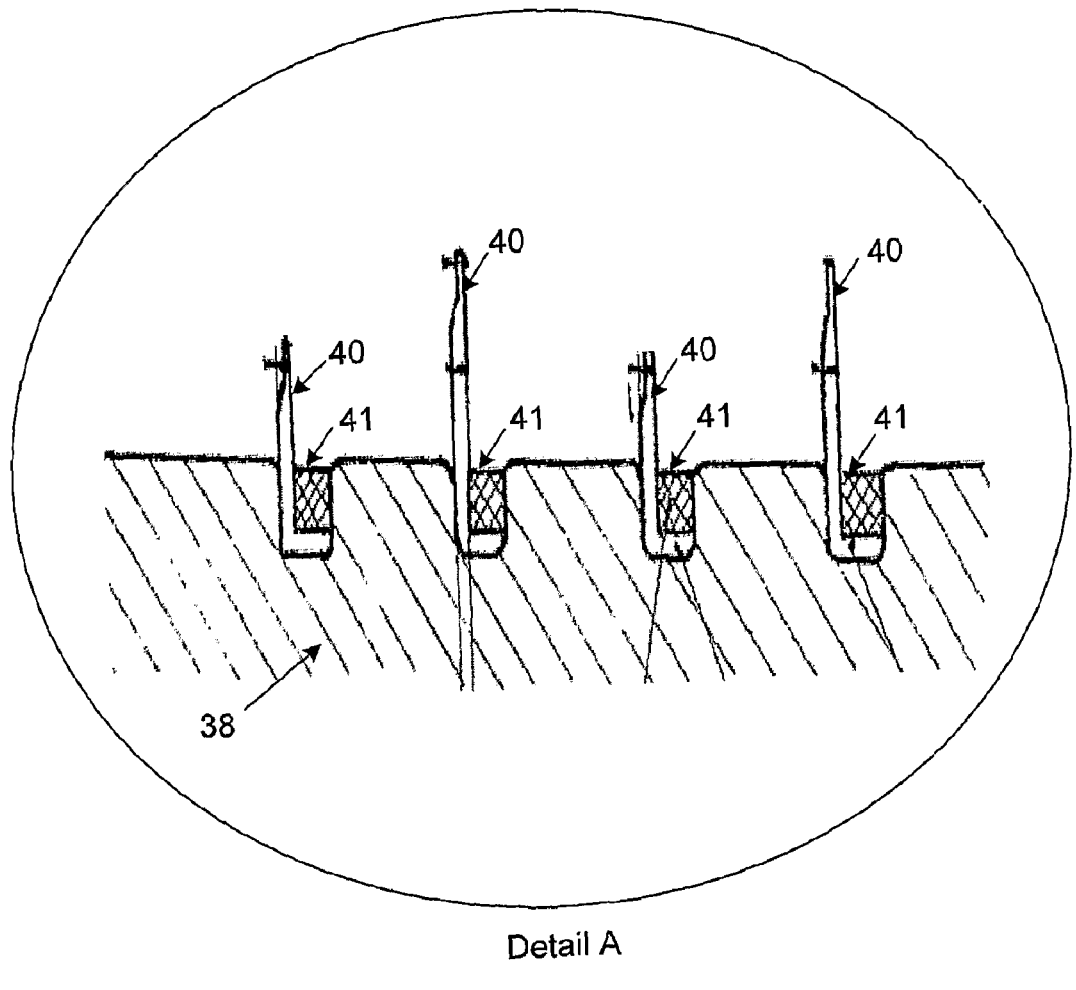
FIG. 12 is a detail of seal fins caulked in the turbine half-casing.

After removal of old caulking wires 41 and old seal fins 40, replacement seal fins 40 can be fitted, and replacement wires 41 caulked into the grooves in the half-casing 38. The inner circumferential edges of the replacement seal fins 40 then need to be ground to create a standardised clearance fit between the replacement seal fins 40 and the rotor shaft and blades (not shown), for example, a H7 fit. This is performed by changing the disc 26 with a disc 27 having a square rim of abrasive material, as illustrated in FIG. 11. The disc 27 is aligned over at the top edge of a replacement seal fin 40. With the disc 27 spinning, it is allowed to touch the seal fin 40 and is fed circumferentially, for example, by about 15 mm to set the position of the disc 27 over the seal fin 40. The depth of the freshly cut (but undercut) height of the seal fin 40 is measured relative to the inner diameter of the half-casing 38. The tool holder 20 is fed the required radial distance to create the desired designed-in clearance or fit, with the disc 27 above the seal fin 40 to be ground. The disc 27 is then fed radially down to start the grinding of the seal fin 40. As soon as the first few millimetres of contact with the seal fin 40 are made, rotation of the boring bar 1 rotation is stopped and the linear scale, sensor 29 and controller 30 are set. The disc 27 is then moved around the half-casing 38 to automatically trim the seal fin 40 to the required set height tolerance regardless of circumferential warping or distortion in the half-casing 38. The half-casing 38 may return very close to its original circular shape when re-bolted together with the other half-casing (not shown), so small additional tolerances may be provided to ensure that any residual casing warping or distortion does not cause fouling between the seal fins 40 and the rotors, or vice versa.

Although not illustrated, the boring machine of the invention may also be used to refurbish seal fins caulked in circumferential grooves in the rotor shaft between adjacent rotor blades. In this application, the seal fins and caulking wires of the rotor shaft are machined by the boring machine while the rotor shaft is rotated in a precision lathe, thereby removing the need for automatic axial adjustment of the tool holder of the boring machine.

Embodiments of the invention therefore enable refurbishment of caulked-in seal fins in turbine half-casings having a variable radius of curvature around their inner diameter due to warping or distortion. Advantageously, the caulked-in seal fins are refurbished on-site where the turbine is normally operated, and with the stator blades in situ in the turbine half-casings.

It will be appreciated that the invention is suitable for use with any and all conventional turbines having caulked-in seal fins.

The above embodiment has been described by way of example only and modifications are possible within the scope of the claims which follow.

The invention claimed is:

1. A boring machine, comprising:
a rotatable boring bar carrying a tool holder that is movable radially of the boring bar, wherein a sensor is provided on the tool holder to sense the proximity thereof to a work piece having a variable radius of curvature in a plane perpendicular to the boring bar, and the tool holder exchangeably holds a rotatable disc having an abrasive and/or cutting periphery.

2. A boring machine according to claim 1, further comprising a motor to move the tool holder radially, and a controller to control the motor in response to the sensor.

3. A boring machine according to claim 2, wherein the controller is programmable so that in use a tool held by the tool holder is controllably moved radially by the motor to follow the variable radius of curvature of the work piece at a preselected working depth during rotation of the boring bar.

4. A boring machine according to claim 1, wherein the tool holder is carried by a carriage that is movable axially along the boring bar.

5. A boring machine according to claim 1, wherein the boring bar is rotatable between supports adapted to removably mount in a turbine half-casing.

6. A boring machine according to claim 1, wherein the work piece is a seal fin and/or an adjacent caulking wire therefor in a groove in the turbine half-casing.

7. A method of refurbishing seals fins caulked in a half-casing of a turbine using a boring machine according to claim 1.

8. A method according to claim 7, wherein the half-casing includes stator blades, and the method is performed with the stator blades in situ in the half-casing.

9. A method according to claim 7 or 8, wherein the method is performed on-site where the turbine is normally operated.

10. A boring machine, comprising:
a rotatable boring bar carrying a tool holder that is movable radially of the boring bar, wherein a sensor is provided on the tool holder to sense the proximity thereof to a work piece having a variable radius of curvature in a plane perpendicular to the boring bar, and the tool holder is carried by a carriage that is movable axially along the boring bar.

11. A boring machine, comprising:
a rotatable boring bar carrying a tool holder that is movable radially of the boring bar, wherein a sensor is provided on the tool holder to sense the proximity thereof to a work piece having a variable radius of curvature in a plane perpendicular to the boring bar, and the boring bar is rotatable between supports adapted to removably mount in a turbine half-casing.

* * * * *